United States Patent Office 3,669,727
Patented June 13, 1972

3,669,727
IMPREGNATION AND LAMINATION RESIN SOLUTIONS, METHODS AND ARTICLES PRODUCED THEREBY
Douglas G. Raymond, Parma Heights, Ohio, assignor to SCM Corporation, Cleveland, Ohio
No Drawing. Filed Mar. 4, 1968, Ser. No. 709,930
Int. Cl. B27k 3/34; B21h 1/34
U.S. Cl. 117—148                                             13 Claims

ABSTRACT OF THE DISCLOSURE

New melamine acrylate-polyester resin solutions and impregnation methods suitable for use in impregnating or coating paper, wood, cloth, fabric, asbestos, and other webbed, fibrous or porous base materials are provided. These impregnated base materials are suitable for fusion to a substrate to form laminated composite articles.

---

This invention relates to thermosetting, unsaturated polyester resin systems containing certain unsaturated melamine acrylate resins as the cross-linking agent.

In a more specific aspect, the present invention relates to a method of pre-impregnating paper to render the paper laminable to various cellulosic substrates such as paper, wood, hardboard, particle board, and plywood; to form a variety of decorative and functional composite articles. The composite articles thus formed have desirable stain and impact resistance, and are attractive in appearance. Additionally, the articles exhibit excellent color retention, chemical durability and chemical resistance.

In another aspect, this invention pertains to match die molding lamination of the pre-impregnating sheets under heat and pressure to form laminated articles of close dimensional tolerances at high rates of production.

Laminated articles are well known and have had wide commercial acceptance. The term "laminate" or "laminated article" generally refers to a stratified article formed by the combined action of heat and pressure on composite assemblies composed of superimposed layers of material in contact with a thermosetting adhesive. These layers or sheets are generally known as laminae.

An "impregnated" material is a webbed, porous or fibrous layer of absorbent material, such as paper, whose pores are filled with resin or other adhesive.

The term "laminated article" also refers to a match die molded article. Match die molded articles are readily formed by the techniques herein disclosed. The initial procedure followed is that which is normally required as standard procedure in the industry for match die molding. The mat or fabric is placed in the mold with the molding resin. An impregnated sheet, such as that described hereinafter, is placed over the mat and resin, and these materials are placed in a female mold cavity. The matching male mold then contacts these overlaying layers within a female mold, and the layers are fused together under the influence of heat and pressure. The impregnated sheet then becomes an integral part of the article.

In the match die process, laminated articles can be molded at cycles of about three minutes at temperatures of about 260 to 300° F. and pressures of up to about 600 p.s.i. Accordingly, the term laminate and laminated articles include such match die molded parts.

The present invention pertains to an improved "impregnated laminated article," "pre-impregnated sheets," impregnation resins; and methods of impregnating at least one of the laminae with resin, prior to the lamination operation.

The formation of impregnated laminated articles is most economically accomplished in one continuous operation in which the impregnation resin (usually a polyester resin) is applied to at least one of the laminae and the laminae are thereafter immediately fused together or laminated. Alternatively, the laminae may also be laminated to any suitable substrate to form a thin coating or veneer. In either case, the lamination requires a thermal curing of the resin or adhesive, usually under pressure, to form the composite article. Unfortunately, a continuous, uninterrupted process is not always possible since the impregnation and lamination are often performed by different processors in different locations. A substantial advance in the art would, therefore, be realized if impregnation resins and impregnation techniques were devised which provided an impregnated (but uncured) sheet which could be easily handled and stored, and yet could be readily thermally laminated to a suitable substrate to form a hard, chemically durable, glossy, impact resistant laminated article such as wall paneling, furniture, kitchen cabinets, case goods shelving, doors, etc. Such is provided by the present invention. Additionally, laminates prepared according to invention are superior to most liquid coatings in hardness while displaying excellent color permanence. They are convenient and easy to handle, cure more rapidly than conventional laminates, and do not become brittle in storage. Distinctive textures can be embossed into the surface during the lamination process and a variety of surface lustres is readily and inexpensively attained.

Now, in accordance with this invention, it has been found that a thermosetting resinous solution, having impregnation and coating characteristics superior to prior art resin systems, is provided by dissolving a polymerizable unsaturated polyester (the reaction product of a polyhydric alcohol and a polycarboxylic acid) and a polymerizable, ethylenically unsaturated melamine acrylate resin, in a relative volatile solvent. The polyester constitutes about 40% to about 90% by weight of the non-volatiles, while the melamine acrylate resin constitutes about 10% to about 60% by weight of the non-volatiles. Also included in the resin solutions are additives for pigmentation, control of flow, gelation inhibitors, cross-linking initiators, flexibilizers and other standard modifiers.

Percent of non-volatile material refers to the percentage amount of dried residue remaining when a quantity of the resin (sufficient to yield abot 0.5 gram of dry residue as a film) is dried at 105° C. for two hours.

THE POLYESTER

Any unsaturated polyester that is copolymerizable into an infusible mass at ordinary lamination temperatures (i.e. about 180° F. and above) can be used in the practice of the present invention. Such polyesters include polymerizable, unsaturated (polyhydric alcohol-polycarboxylic acid) polyesters that are prepared by the reaction of one or more polyhydric alcohols with one or more polybasic acids or anhydrides. Examples of these polyesters are the products prepared by the reaction of alpha-beta, ethylenically unsaturated dicarboxylic acids or anhydrides including maleic, fumaric, citraconic, itaconic, aconitic, mesaconic, chloromaleic, and the like, and mixtures thereof; with a glycol such as ethylene glycol, propylene glycol, diethylene glycol, dipropylene glycol, triethylene glycol, any butylene glycol, pentylene glycol and the like, and mixtures thereof.

According to conventional practice, the anhydrides of these acids, when they exist, can also be used and in certain instances are preferred. It is, of course, essential that in preparing the unsaturated polyester sufficient unreacted double bonds of the dicarboxylic acid are available for subsequent cross-linking with the unsaturated, melamine acrylate resin during the lamination process. It will also be understood that it is often preferred that part of the unsaturated dicarboxylic acid be replaced with a saturated dicarboxylic acid to tailor the performance characteristics of the finished laminate. This substitution of saturated for unsaturated polybasic acid is well known to polyester formulators. Suitable saturated acids or anhydrides include phthalic, isophthalic, terephthalic, oxalic, malonic, succinic, glutaric, sebacic, adipic, pimilic, suberic, azelaric, tricarballyic and the like and mixtures thereof.

The above described polyester component of the present coating is well known in the art.

The polyester resin prepared by reacting isophthalic and/or orthophthalic acid and maleic acid and/or anhydride and/or fumaric acid, together with ethylene glycol, propylene glycol or other diols, have been found particularly suitable for the present purpose.

THE MELAMINE ACRYLATE CROSS-LINKING AGENT

The unsaturated melamine acrylate resin, which is in solution with the above described polyester during the impregnation process and subsequently functions as a cross-linking agent during the lamination process, can be described as the transetherification reaction product of a lower alkoxymethyl melamine and a hydroxy alkyl acrylate represented by the formula

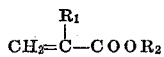

wherein $R_1$ is a member selected from the group consisting of H, halogen and alkyl groups containing 1 to 4 carbon atoms, and $R_2$ is a monohydroxy substituted alkyl group containing 1 to 4 carbon atoms. Such compounds include 2-hydroxyethyl acrylates, 2-hydroxyethyl methacrylate, 2-hydroxypropyl acrylate, 2-hydroxypropyl methacrylate, 2-chloroacrylates and the like. The preferred melamine acrylates are formed by the reaction of a poly (primarily hexa and penta) methoxymethyl melamine and dimers and trimers thereof, with a hydroxy alkyl methacrylate. It has been found that the presence of an appreciable amount of unreacted acrylate ester in the resin solution is not detrimental to the subsequent lamination process.

In the preferred practice hydroxyethyl or hydroxypropyl methacrylates are employed.

These melamine acrylate resins are thermally stable and exert low vapor pressure at the temperatures prevailing during the impregnation and drying processes. Additional unsaturated melamine acrylate resins that are suitable for the present purposes are described in U.S. Pat. 3,020,255.

THE IMPREGNATION RESIN SOLUTION

The impregnation resin solution is prepared by dissolving the above described unsaturated polyester, and the above described unsaturated melamine acrylate resin in a suitable volatile solvent. By volatile solvent is meant a solvent or combination of solvent that will be substantially vaporized from the impregnated sheet at temperatures up to 230° F. at time periods of up to 10 minutes. Suitable solvents include aliphatic hydrocarbons such as alkanes, lower alkanols, (methanol ethanol, etc.), ketones (lower ketones such as acetone, methyl ethyl ketone, diethyl ketone and the like), as well as aromatic solvents such as benzene, toluene, and xylene; the various naphtha solvents are also suitable.

The ketones, while readily volatile at low temperatures, often lead to blistering in the impregnated sheet due to the rapid or uncontrolled vaporization at drying temperatures of 150–200° F.

The aromatics, on the other hand, are slower to vaporize at temperatures around 150–200° F. and blistering is not encountered. Longer drying times are required with the aromatics and consequently, the possibility of premature cross-linking between the polyester and the acrylate can be a problem.

For these reasons, it is often desirable to use a blend of the volatile aliphatics with the less volatile aromatics to achieve rapid, blister-free drying. In any event, the drying temperatures and time of the impregnated sheet are selected to vaporize the solvent without causing substantial cross-linking between the polyester and the melamine acrylate. Accordingly, inhibitors such as hydroquinone, p-nitroso dimethylanaline, and p-tert-butyl catechol and the like are often used in the resin solution to prevent premature gelation during the impregnation and drying process.

Thermally activated, free radical initiators such as the organic peroxides including dicumyl peroxide, p-chlorobenzoyl peroxide, benzoyl peroxide, lauroyl peroxide and the like, are also dissolved in the resin solution. The thermal activation characteristic of the initiators are selected so that substantial copolymerization between the polyester and the melamine acrylate will not take place at the times and temperatures required to dry the solvent from the impregnated sheet. This feature will be more fully explained below.

In preparing the resin solution, the relatively volatile solvent is employed so that the solvent can be subsequently removed from the impregnated sheet without reaching the thermal conditions (time and temperature) at which substantial cross-linking or copolymerization of the polyester and the melamine acrylate is initiated. These thermal conditions for drying the impregnated sheet include temperatures up to about 200 to 230° F. for time periods ranging up to about 5 or 10 minutes. Under these conditions, the solvent is substantially driven from the sheet and the dry, tack-free surface is achieved.

THE IMPREGNATED SHEET

This dry tack-free impregnated sheet contains about 35 to 75% by weight of precatalyzed copolymerizable resin mixture. The lower resin contents (about 35–55% by weight) are suitable for textural overlay for a paint base. The impregnated sheets having lower resin content assure permanent cohesion of the laminae without detracting from the adherence of a paint top coat.

Impregnated sheets of intermediate resin content (about 55 to 70% by weight) are suitable in forming decorative overlays such as wood grains or abstract patterns. It has been found that the 60–65% by weight resin impregnated sheets are particularly suited to forming decorative overlays.

Impregnated sheets containing 70% or more weight to resin are used in making very hard, high gloss, clear laminates.

These impregnated sheets can then be handled, shipped or stored for several months while remaining readily laminable to a suitable substrate through the in-situ copolymerization on the polyester and the melamine acrylate.

THE LAMINATION PROCESS

The above described resin-impregnated sheets are laminable over a wide range of pressures (100 to 600 p.s.i.g.), temperatures (about 240° to 300° F.), and time cycles (about 2 to 10 minutes) with lower temperatures requiring longer time cycles. The higher pressures tend to improve abrasion resistance and laminate hardness. Since the impregnation resin is thermosetting, the laminates can be stacked hot out of the press. A typical cycle for laminating a resin impregnated sheet is 6 minutes at 200 p.s.i.g. and 260° F., although laminates have been produced in cycles of 4 minutes at 275° F. and 200 p.s.i.g.; and 5½ minutes at 260° F. and 170 p.s.i.g.

In order to permit those skilled in the art to better understand the practice on the present invention, the following examples are given. These examples are, of course, for the purpose of illustration rather than limitation. All parts specified are parts by weight unless indicated otherwise.

EXAMPLE 1

Preparation of the polyester resin

An unsaturated polyester resin was prepared by reacting 696 grams of ethylene glycol and 2128 grams of propylene glycol with 3098 grams of isophthalic acid and 2249 grams of maleic anhydride until esterification was substantially complete as indicated by the acid number of about 15 to 20. The resulting polyester was then diluted with 2249 grams of toluene.

EXAMPLE 2

Preparation of the unsaturated melamine acrylate resin

The melamine acrylate compound was prepared by reacting 780 grams of hexamethoxymethylmelamine with 900 grams of 2-hydroxypropymethacrylate in the presence of 16.8 grams of 98% sulfuric acid as a catalyst, and 0.8 gram of hydroquinone as an inhibitor. The reaction was carried out in a stirred, heated reaction flask set up for vacuum distillation.

The reactants were stirred and heated to a pot temperature of about 190° F. over a period of about 2 hours while methanol was vacuum distilled off. Air was bubbled through the reaction flask to prevent premature gelation.

At the end of this period, 198 grams of methanol had been collected in the distillate receiver and a viscous, water-white liquid remained in the reaction flask.

EXAMPLE 3

Preparation of impregnation resin solution

To a stirred reaction vessel were charged 613.9 grams of polyester prepared in Example 1, 116.6 grams of melamine acrylate prepared in Example 2, 0.4 gram of hydroquinone, 116.6 grams of silica (pigment), 10 grams of Cab-O-Sil (extender), 35.1 grams of toluene and 87.7 grams of methyl ethyl ketone.

The reactants were stirred and the temperature was maintained at about 100 to 110° F. until a solution of miscible components was achieved.

EXAMPLE 4

Paper impregnation

Several sheets of decorative, laminating, saturating paper, 65 pound grade (24" x 36" x 500 pieces) were immersed in the resin solution prepared in Example 3 to which solution 1% of benzoyl peroxide (based on the weight of resin solution) had been previously added. The excess resin was removed from the paper with a doctor blade and the paper was dried in an oven at a temperature of about 170° F. for a period of about 2 to 5 minutes. At the end of this period, the paper had dried to a blister-free, tack-free surface. The impregnated paper stock contained about 60–62% resin by weight, and was about 9–10 mils in thickness.

The paper stock was then laminated onto a plywood substrate in a lamination press at temperatures of about 260° F. to 280° F. for 6 minutes at about 200 p.s.i.g. The laminated articles was quite attractive in appearance, and exhibited excellent abrasion resistance, chemical resistance and impact resistance. The laminate was quite machineable and could be drilled, sawed or routed without chipping.

These properties were evaluated according to the NEMA specification with the following results:

| Test | | Results |
|---|---|---|
| Resistance of surface to wear and abrasion. (Taber abraser with sandpaper abrasive). | (NEMA LD1-2.01). | 200 cycles. Wear factor 0.06–0.08, gms. per 100 cycles. |
| Resistance of surface to boiling water. | (NEMA LD1-2.02). | Unaffected by boiling water in 20 minute exposure; unaffected in 20 minutes by live steam. |
| Resistance of surface to ultraviolet degradation. | (NEMA LD1-2.06). | Exposure for 50 hours in a standard Fade-Ometer, no discoloration observed. |
| Resistance of surface to staining. | (NEMA LD1-2.05). | Meets NEMA standard for all reagents except 1% iodine in alcohol (slight stain is produced). Test includes exposure to ketones, esters, aliphatics and aromatics as well as household sprays and spot removers. |
| Resistance of surface to high temperature. | (NEMA LD1-2.03). | Excellent—Unaffected in 20 minutes by exposure to hot metal at 180° C. (356° F.). |
| Resistance of surface to impact. (Falling Ball Test). | (NEMA LD1-2.15). | First fracture occurs at 20–22 inch drop with a 1½ inch diameter 8 ounce ball. |

EXAMPLE 5

Paper impregnation

Part of the resin solution prepared in Example 3 was catalyzed with 1% tertiary butyl perbenzoate (TBP). The TBP added was 1% of the amount of resin solution employed. Stock paper similar to that described in Example 4 was impregnated with the resin solution by the method described in Example 4. The impregnated paper was dried at about 210° F. for a period of about 5 minutes.

The dry impregnated sheets were tack-free and could be readily handled and stored.

The dryed impregnated sheets were laminated to a particle-board substrate in a lamination press at 275° F. for 15 minutes.

A laminated product having properties similar to that described in Example 4 was obtained. The NEMA test performance was similar to the test performance reported for the product of Example 4.

From the foregoing, it is apparent that novel resin solutions, methods of impregnating porous sheets with these resins, novel impregnated sheets, methods of forming laminated articles and novel laminated articles are provided by the present invention.

Having thus described the invention, what is claimed is:

1. A blister-free, tack-free laminable sheet thermally laminable to a substrate to form a hard, chemically durable glossy impact-resistant laminated article, said sheet comprising a porous, fibrous cellulosic base, and an in situ copolymerizable, thermosetting resin mixture permeating said base, said resin mixture comprising an unsaturated polyester physically interspersed with a melamine acrylate, said melamine acrylate comprising the transetherification reaction product of a lower alkoxy methyl melamine and hydroxy alkyl acrylate, and,
   a thermally activated crosslinking initiator and a polymerization inhibitor to prevent premature gelation prior to thermally activating said initiator.

2. The sheet of claim 1 wherein the melamine acrylate comprises the reaction product of a poly methoxy methyl melamine and a hydroxy alkyl acrylate, represented by the formula:

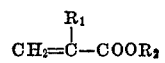

wherein $R_1$ is a member selected from the group consisting of H, halogen and alkyl groups containing 1 to 4 carbon atoms and $R_2$ is a mono-hydroxy substitute alkyl group containing 1 to 4 carbon atoms.

3. The sheet of claim 2 wherein said resin mixtures comprises about 35–75% by weight of said laminable sheet.

4. The sheet of claim 3 wherein said resin mixture comprises about 55–70% by weight of said laminable sheet.

5. The sheet of claim 3 wherein said resin mixture comprises about 60–65% by weight of said laminable sheet.

6. The sheet of claim 2 wherein said initiator comprises an organic peroxide.

7. The sheet of claim 2 wherein said base is paper.

8. The sheet of claim 2 wherein said base is wood.

9. The sheet of claim 2 wherein said poly methoxy methyl melamine is hexa methoxy methyl melamine.

10. The sheet of claim 9 wherein said hydroxy alkyl acrylate is 2-hydroxy propyl methacrylate.

11. In the process for preconditioning a porous, fibrous, cellulosic sheet to render said sheet laminable to a substrate under the influence of heat and pressure to form a glossy, chemically durable, impact-resistant laminated article, the improvement which comprises, impregnating said sheet with a resin solution comprising a volatile solvent having dissolved therein: an unsaturated polyester resin; an unsaturated melamine acrylate crosslinking resin, said crosslinking resin comprising the transetherification reaction product of a lower alkoxyl methyl melamine and hydroxyalkyl acrylate; a thermally activated crosslinking initiator; and a polymerization inhibitor to prevent premature gelation prior to thermally activating said initiator, and drying said impregnated sheet at a temperature and for a time sufficient to vaporize the solvent, but insufficient to cause substantial crosslinking between the polyester and the melamine acrylate to form a substantially blister-free and tack-free laminable sheet.

12. The process of claim 4 wherein said melamine acrylate cross-linking resin comprises the reaction product of a poly methoxy methyl melamine and a hydroxyalkyl acrylate represented by the formula:

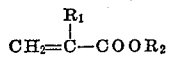

wherein $R_1$ is a member selected from the group consisting of H, halogen and alkyl groups containing 1 to 4 carbon atoms, and $R_2$ is a mono-hydroxy substituted alkyl group containing 1 to 4 carbon atoms.

13. The process of claim 12 wherein said poly methoxy methyl melamine is hexa methoxy methyl melamine.

References Cited

UNITED STATES PATENTS

| 2,510,503 | 6/1950 | Kropa | 161—233 X |
| 3,468,754 | 9/1969 | Greenspan | 161—250 |
| 3,020,255 | 2/1962 | Magrane et al. | 260—45.3 |
| 3,047,531 | 7/1962 | D'Alelio | 260—45.4 |
| 3,047,532 | 7/1962 | D'Alelio | 260—45.4 |
| 3,056,760 | 10/1962 | D'Alelio | 260—45.4 |

OTHER REFERENCES

"Polyester Resins" by John R. Lawrence, pp. 141–145, Reinhold Publishing Corporation (1960).

ROBERT F. BURNETT, Primary Examiner

J. C. GIL, Assistant Examiner

U.S. Cl. X.R.

117—155 UA, 161 UZ, 161 UC; 156—313; 161—231, 233, 270; 260—29.1 R; 850, 868

PO-1050
(5/69)

UNITED STATES PATENT OFFICE
CERTIFICATE OF CORRECTION

Patent No. 3,669,727        Dated June 13, 1972

Inventor(s) Douglas G. Raymond

It is certified that error appears in the above-identified patent and that said Letters Patent are hereby corrected as shown below:

Column 8, line 3, "4" should read --11--.

Signed and sealed this 6th day of February 1973.

(SEAL)
Attest:

EDWARD M. FLETCHER, JR.        ROBERT GOTTSCHALK
Attesting Officer        Commissioner of Patents